United States Patent
Cheng et al.

(10) Patent No.: US 10,606,369 B2
(45) Date of Patent: Mar. 31, 2020

(54) INFORMATION DISPLAY METHOD AND INFORMATION DISPLAY SYSTEM

(71) Applicant: Acer Incorporated, New Taipei (TW)

(72) Inventors: Yu-Chuan Cheng, New Taipei (TW); Ling-Fan Tsao, New Taipei (TW); Cheng-Tsung Wu, New Taipei (TW)

(73) Assignee: Acer Incorporated, New Taipei (TW)

( * ) Notice: Subject to any disclaimer, the term of this patent is extended or adjusted under 35 U.S.C. 154(b) by 8 days.

(21) Appl. No.: 15/802,487

(22) Filed: Nov. 3, 2017

(65) Prior Publication Data

US 2018/0203523 A1 Jul. 19, 2018

(30) Foreign Application Priority Data

Jan. 19, 2017 (TW) .............................. 106101815 A

(51) Int. Cl.
*G06F 3/02* (2006.01)
*H01H 13/83* (2006.01)

(52) U.S. Cl.
CPC ............ *G06F 3/0227* (2013.01); *G06F 3/021* (2013.01); *G06F 3/0219* (2013.01); *H01H 13/83* (2013.01); *H01H 2219/016* (2013.01); *H01H 2219/039* (2013.01)

(58) Field of Classification Search
CPC ...... G06F 3/0227; G06F 3/021; G06F 3/0219; H01H 13/83
See application file for complete search history.

(56) References Cited

U.S. PATENT DOCUMENTS

| | | | |
|---|---|---|---|
| 2005/0062722 A1* | 3/2005 | Hsieh | G06F 1/206 345/168 |
| 2007/0025097 A1 | 2/2007 | Cheng | |
| 2010/0281410 A1* | 11/2010 | Heintze | G06F 3/0202 715/769 |
| 2012/0253542 A1* | 10/2012 | Nurmi | H05B 33/0824 700/299 |
| 2013/0265740 A1 | 10/2013 | Lee | |
| 2014/0028565 A1* | 1/2014 | Gueorguiev | G06F 1/1662 345/168 |
| 2018/0225087 A1* | 8/2018 | Lin | G06F 3/0236 |

FOREIGN PATENT DOCUMENTS

| | | |
|---|---|---|
| CN | 1852341 | 10/2006 |
| CN | 101923978 | 12/2010 |
| CN | 105677544 | 6/2016 |
| TW | 200508943 | 3/2005 |
| TW | 201042689 | 12/2010 |
| TW | M445248 | 1/2013 |

* cited by examiner

*Primary Examiner* — Towfiq Elahi
(74) *Attorney, Agent, or Firm* — JCIPRNET

(57) ABSTRACT

An information display method for a computer having a keyboard. The method includes selecting a first system information among a plurality of system information, wherein the system information is configured to respectively indicate statuses of a plurality of devices of the computer; selecting a first display pattern among a plurality of display patterns according to the first system information; selecting a first keyboard region for applying the first display pattern; and showing the first system information in real-time by a plurality of first buttons corresponding to the first keyboard region of the keyboard according to the selected first display pattern, the first keyboard region and the first system information.

6 Claims, 8 Drawing Sheets

```
                                                                    ┌─ S307
┌──────────────────────────────────────────────────────────────────┐
│      Make the plurality of first keys corresponding to the first │
│       keyboard region of the keyboard display the first system   │
│   information in real-time according to the selected first display│
│     pattern, the first keyboard region, and the first system     │
│                           information                            │
│   ┌──────────────────────────────────────────────────┐           │
│   │  Continuously detect a first status of a first device in │   │
│   │   a plurality of devices according to the first system  ├─ S3071
│   │                    information                    │           │
│   └──────────────────────────────────────────────────┘           │
│                             ↓                                    │
│   ┌──────────────────────────────────────────────────┐           │
│   │ Determine a first pattern of a plurality of patterns of │    │
│   │ a first design of the first display pattern, a first color│  │
│   │ to display the first pattern and a first time length to ├─ S3073
│   │    display the first pattern according to the detected │     │
│   │                       first status                │           │
│   └──────────────────────────────────────────────────┘           │
│                             ↓                                    │
│   ┌──────────────────────────────────────────────────┐           │
│   │  Control the plurality of first keys to display the first │  │
│   │ system information according to the first pattern, the ├─ S3075
│   │       first color, and the first time length       │         │
│   └──────────────────────────────────────────────────┘           │
└──────────────────────────────────────────────────────────────────┘
```

FIG. 6C

INFORMATION DISPLAY METHOD AND INFORMATION DISPLAY SYSTEM

CROSS-REFERENCE TO RELATED APPLICATION

This application claims the priority benefit of Taiwan application serial no. 106101815, filed on Jan. 19, 2017. The entirety of the above-mentioned patent application is hereby incorporated by reference herein and made a part of this specification.

BACKGROUND

1. Technical Field

The disclosure relates to an information display method, and in particular, to an information display method and an information display system applied to a computer/host having a keyboard.

2. Description of Related Art

With the rise of the Gaming business, a lot of users have higher requirements for hardware devices of a computer. In addition to basic computer performance, the users further hope that the computer can be more trendy and attractive in appearance. Therefore, keyboards that can emit light (for example, LED keyboards) are products generated conforming to the trend. However, current keyboards that can emit light only can make an overall keyboard generate different colors by using backlight with different colors, and only have a decorative function.

Generally, when a user wants to view some system information, for example, a CPU usage rate, a GPU usage rate, or a battery power level of a computer, the user must open a particular window or click a particular program. However, this manner of obtaining system information is far from convenient for current users (players). In particular, an image of the system information also occupies an image of current game.

SUMMARY

The disclosure provides an information display method and an information display system, to display, in real-time, system information that a user is concerned about by using a keyboard.

An embodiment of the disclosure provides an information display method applied to a computer having a keyboard. The method comprises: selecting a first system information among a plurality of system information, wherein the system information are used to respectively indicate statuses of a plurality of devices of the computer; selecting a first display pattern among a plurality of display patterns according to the first system information; selecting a first keyboard region for applying the first display pattern; and making a plurality of first keys corresponding to the first keyboard region of the keyboard display the first system information in real-time according to the selected first display pattern, the first keyboard region, and the first system information.

An embodiment of the disclosure provides an information display system, which comprises a keyboard and a host. The host is coupled to the keyboard. The host comprises a processor and a storage device. The storage device is coupled to the processor and is configured to record a plurality of program code modules. The processor accesses and executes the plurality of program code modules. The program code modules comprise an information management module, an input module, a display pattern database, and a system information database. The input module is configured to receive a plurality of input signals. The information management module selects, according to a first input signal in the input signals, a first system information among a plurality of system information recorded by the system information database; the information management module selects, according to the first system information and a second input signal in the input signals, a first display pattern among a plurality of display patterns recorded by the display pattern database; the information management module selects, according to a third input signal in the input signals, a first keyboard region used to apply the first display pattern; and the information management module makes a plurality of first keys corresponding to the first keyboard region of the keyboard display the first system information in real-time according to the selected first display pattern, the first keyboard region, and the first system information.

Based on the above, according to the information display method and the information display system provided by an embodiment of the disclosure, a user can select system information to be concerned about and a keyboard region to be configured, so as to control a plurality of keys in the keyboard region on the keyboard according to different display patterns and the system information detected in real-time, thereby making a design formed by arrangement of the keys display the system information.

In order to make the aforementioned features and advantages of the disclosure more comprehensible, embodiments accompanying figures are described in detail below.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

FIG. 4 is a flowchart of step S307 of FIG. 3 according to an embodiment of the disclosure.

FIG. 5A is a schematic diagram of a display pattern, in which corresponding system information is a processor temperature according to an embodiment of the disclosure.

FIGS. 5B and 5C are schematic diagrams of a keyboard that displays system information as a processor temperature according to an embodiment of the disclosure.

FIG. 6A is a schematic diagram of a display pattern, in which corresponding system information is a battery power level according to an embodiment of the disclosure.

FIGS. 6B and 6C are schematic diagrams of a keyboard that displays system information as a battery power level according to an embodiment of the disclosure.

DESCRIPTION OF THE EMBODIMENTS

Figure 1:
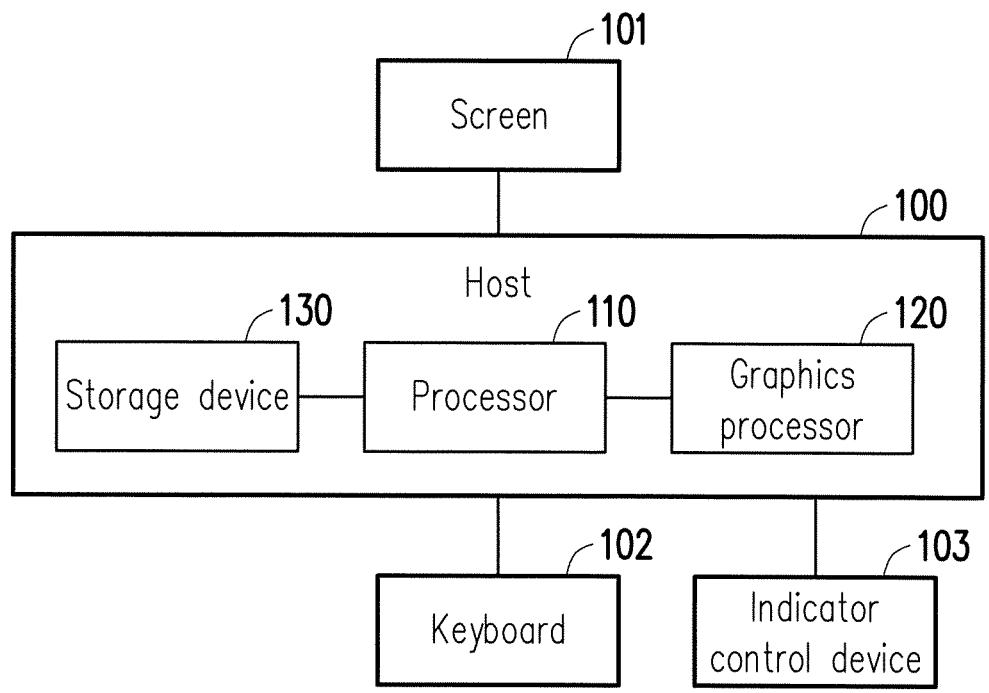
FIG. 1 is a block diagram of an information display system according to an embodiment of the disclosure.

Reference will now be made in detail to the present preferred embodiments of the disclosure, examples of which are illustrated in the accompanying drawings. Wherever possible, the same reference numbers are used in the drawings and the description to refer to the same or like parts.

FIG. 1 is a block diagram of an information display system according to an embodiment of the disclosure. Referring to FIG. 1, in the present embodiment, an information display system 10 comprises a host 100, a screen 101, a keyboard 102, and an indicator control device 103. The screen 101, the keyboard 102, and the indicator control device 103 are respectively coupled to the host 100 in a wired or wireless manner. It should be noted that, in another embodiment, the screen 101, the keyboard 102, or the indicator control device 103 may be integrated into the host 100. The indicator control device 103 is selectively configured. The host 100, for example, is a computer host such as a personal computer, a notebook computer, a workstation, a server, or a tablet computer.

The screen 101 is configured to display content of a/an desktop/application of an operating system of the host 100. For example, the screen 101 may be a liquid crystal display (LCD), a light-emitting diode (LED), or a field emission display (FED). The screen 101 may also be a touch display unit formed by a display panel of a display of another type and a touch panel, for example, a resistive touch panel, a capacitive touch panel, or an optical touch panel, so as to provide display and touch operating functions at the same time, or a display that can provide a display function.

The keyboard 102 has a plurality of keys, and each of the keys corresponds to a particular character or function. The keyboard 102 may generate an input signal corresponding to a key by means of the key pressed (by a user), and transmits the generated input signal to the host. The host may perform a corresponding operation according to the received input signal. In this way, the user can input information or deliver an instruction to the host by means of the keyboard. In the present embodiment, the keyboard 102 further has a light-emitting element corresponding to each key. In the present embodiment, the light-emitting element is a backlight module (BLM) that uses, for example, a light-emitting diode (LED) as a light source, and the light-emitting element can be controlled to change a color of light emitted by the light-emitting element. The light-emitting element may be disposed below the key or integrated into the key. The disclosure does not limit a type of the light-emitting element.

The indicator control device 103 is configured to position or perform other control (for example, control operations such as dragging an object, clicking an option, or selecting an object) on a cursor in an image currently displayed by the screen. In the present embodiment, the indicator control device 103, for example, is a mouse. However, the disclosure is not limited thereto. For example, in another embodiment, the indicator control device 103 may be an indicator control device in another form, such as a touch panel or a trackball.

The host 100 comprises a processor 110, an graphics processor 120, and a storage device 130. The storage device 130 and the graphics processor 120 are respectively coupled to the processor 110. The graphics processor 120 is selectively configured.

The processor 110 is hardware having operating capabilities (for example, a chipset or a processor), and is configured to control overall operation of the host 100. In the present exemplary embodiment, the processor 110, for example, is a central processing unit (CPU), a micro-processor, or another programmable processing unit (microprocessor), a digital signal processor (DSP), a programmable controller, application specific integrated circuits (ASIC), a programmable logic device (PLD), or another similar device.

A graphic processor 120, also called a graphics processing unit (GPU), a display core, a visual processor, a display chip or a graphics chip, is a micro-processor that dedicatedly performs graphics operation work on personal computers, workstations, game machines, and some mobile devices (for example, tablet computers and smartphones).

The storage device 130 is coupled to the processor 110. The storage device 130 may temporarily store data by an instruction of the processor 110. In addition, the storage device 130 may further record, by the instruction of the processor 110, some data that needs to be stored in a long time, for example, firmware or software used to manage the host 100, a plurality of applications installed in the host (for example, an information display module 200), data stored in the host 100 by the user, but the disclosure is not limited thereto. The storage device 130 is coupled to the processor 110. The storage device 130 may be a hard disk drive (HDD) in any type or a non-volatile memory storage device.

Figure 2:
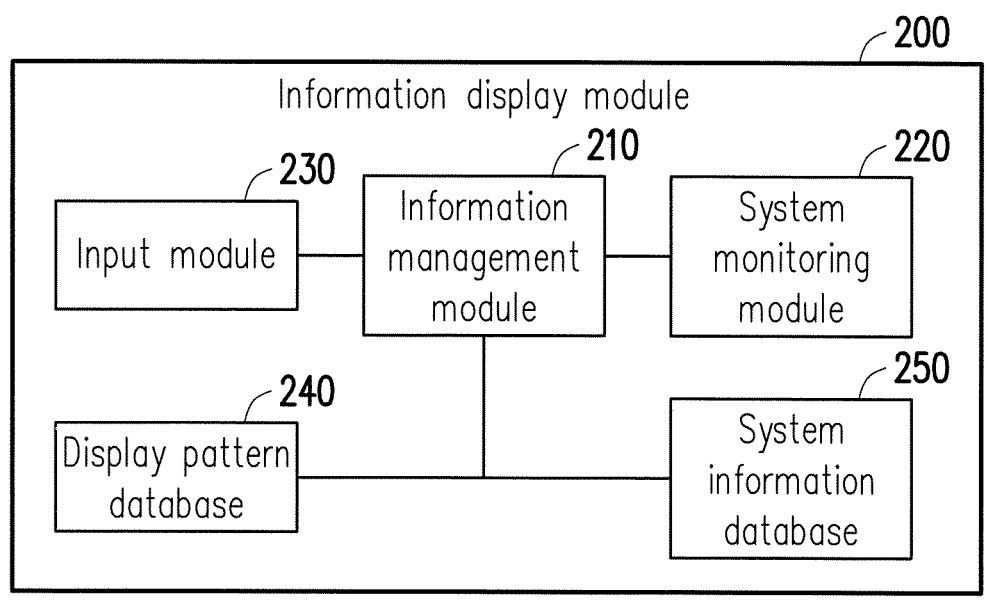
FIG. 2 is a block diagram of an information display module according to an embodiment of the disclosure.

FIG. 2 is a block diagram of an information display module according to an embodiment of the disclosure. Referring to FIG. 2, in the present embodiment, an information display module 200 is an application stored in a storage device 130, and a processor 110 can access and execute the information display module 200 in the storage device 130, so as to implement an information display method provided in the present embodiment.

The information display module 200 comprises a plurality of program code modules, which comprise an information management module 210, a system monitoring module 220, an input module 230, a display pattern database 240, and a system information database 250. The system monitoring module 220, the input module 230, the display pattern database 240, and the system information database 250 are respectively coupled to the information management module 210.

In the present embodiment, the information management module 210 is configured to manage overall operation of the information display module 200.

The system monitoring module 220 can detect status information of various devices of the host 100. The devices comprise the processor 110, an graphics processor 120, and the storage device 130, and the status information comprises information such as a temperature, a usage rate, or a voltage. The status information may further comprise information such as a battery power level, a fan speed, or local time. More specifically, the status may further comprise various information for games, for example, information such as a network speed or an frame update rate.

The input module 230 may provide an interface for a user to input information, so as to select information to be displayed on a keyboard in cooperation with requirements of the user (as mentioned above, the user may input information by operating a keyboard 102 or an indicator control device 103). For example, the user may select system information to be displayed through the input module 230; the user may select a display pattern of the system information through the input module 230; or the user may select a keyboard region for displaying the system information through the input module 230. Next, the input module 230 generates different input signals to the information management module 210 according to different selections performed by the user, so that the information management module 210 can perform a corresponding information display operation, thereby satisfying requirements of the user. The disclosure is not limited to the interface provided by the input module 230.

Figures 5A, 5B:
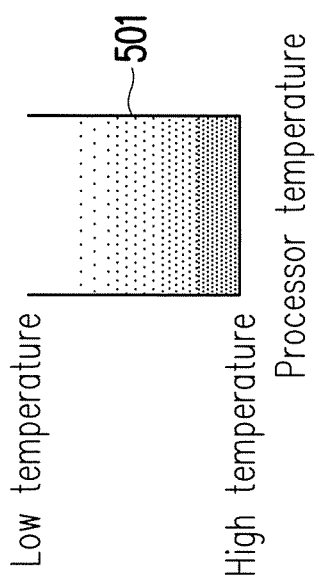

The display pattern database 240 records a plurality of display patterns. The plurality of display patterns may correspond to different system information. The display patterns record designs, colors, durations, or a combination thereof for displaying system information on a plurality of keys of the keyboard. For example, a display pattern for displaying a processor temperature is shown in FIG. 5A, that is, the processor temperature from a low temperature to a high temperature may be presented by light-to-dark gradient colors. For another example, a processor usage rate may be displayed by a columnar (also called a first design) display pattern, that is, the processor usage rate from a low usage rate to a high usage rate may be presented by short-to-long columnar designs (short-to-long first designs in different patterns). The interface provided by the input module 230 may let the user to select different display patterns.

FIG. 5A is a schematic diagram of a keyboard for displaying system information according to an embodiment of the disclosure. Referring to FIG. 5A, suppose selected first system information is a processor temperature, and a first display pattern corresponding to the processor temperature indicates that the processor temperature from a low temperature to a high temperature may be presented by light-to-dark gradient colors. That is, the first display pattern is a first design 501 having a plurality of patterns, wherein the patterns of the first design 501 are shown in FIG. 5A, and from a low temperature to a high temperature are indicated by light-to-dark color patterns. If a detected processor temperature is a low temperature, the first design 501 presents a light color pattern corresponding to the low temperature; and if the detected processor temperature is a high temperature, the first design 501 presents a dark color pattern corresponding to the high temperature. In other words, in the present embodiment, the first design 501, in which corresponding system information is a processor temperature, accordingly presents different patterns with light and dark colors according to the detected processor temperature.

Returning to FIG. 2, the system information database 250 records a plurality of system information. As stated above, the system information comprises information such as temperatures, usage rates, or voltages corresponding to a plurality of devices, or comprises information such as battery power levels, fan speeds, local time, network speeds, or frame update rates. The interface provided by the input module 230 may let the user to select system information that the user wants to detect/display. It should be noted that the display pattern database 240 and system information database 250 may also be integrated into the interface provided by the input module 230 or the information management module 210.

Figure 3:
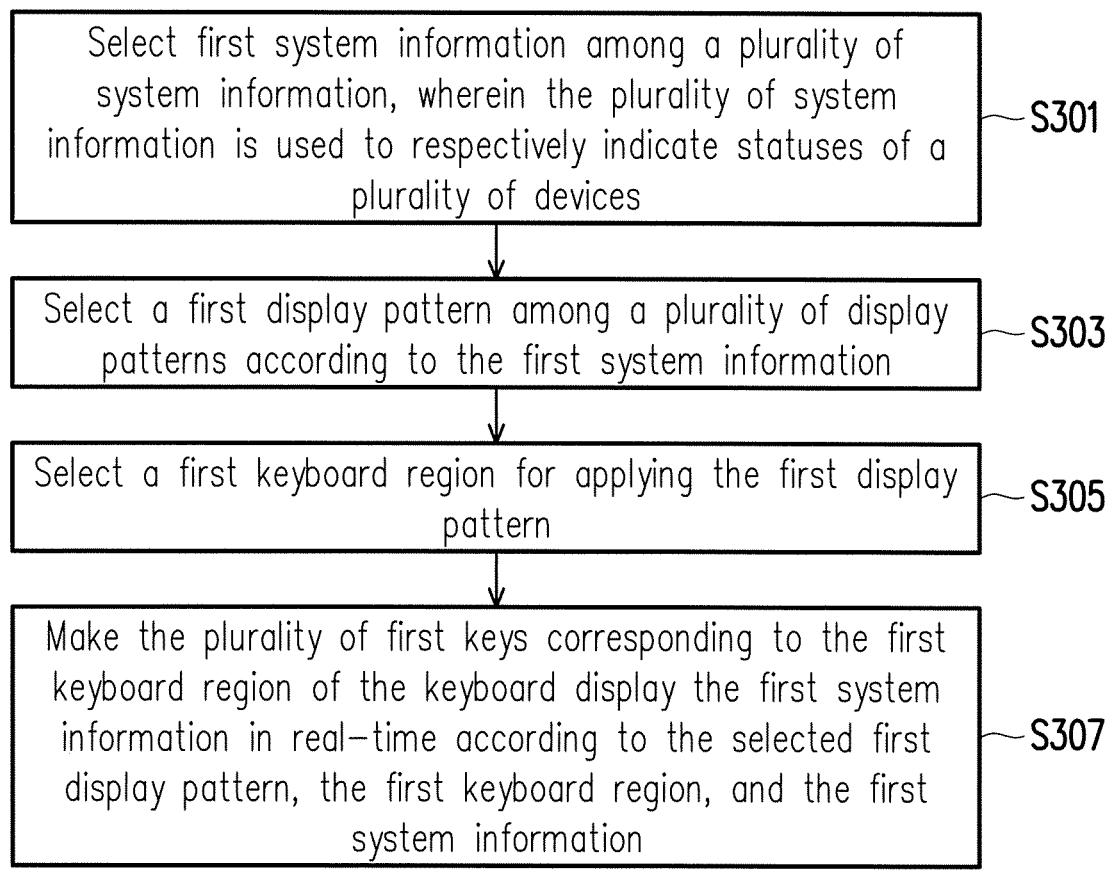
FIG. 3 is a flowchart of an information display method according to an embodiment of the disclosure.

FIG. 3 is a flowchart of an information display method according to an embodiment of the disclosure. Referring to FIG. 3, in step S301, an information management module 210 selects first system information among a plurality of system information, wherein the plurality of system information is used to respectively indicate statuses of a plurality of devices. Specifically, after an information display module 200 is executed, first, an input module 230 provides a plurality of system information according to a system information database 250, so that a user can select system information that the user wants to display on a keyboard. Next, the input module 230 generates a first input signal according to the system information selected by the user, and transmits the first input signal to the information management module 210. Next, the information management module 210 selects, according to the first input signal, the first system information among the plurality of system information recorded by the system information database 250.

In step S303, the information management module 210 selects a first display pattern among a plurality of display patterns according to the first system information. Specifically, after the first system information is determined, the input module 230 provides a plurality of display patterns according to a display pattern database 240, so that the user selects one of the plurality of display patterns to display the first system information on the keyboard. The information management module 210 instructs, according to the first system information, the input module 230 to provide the plurality of display patterns for displaying the first system information. Next, the input module 230 generates a second input signal according to the display pattern selected by the user, and transmits the second input signal to the information management module 210. Next, the information management module 210 selects, according to the second input signal, the first display pattern among the recorded plurality of display patterns.

In step S305, the information management module 210 selects a first keyboard region for applying the first display pattern. A manner for selecting the keyboard region is described in detail below with reference to FIG. 7.

After the first keyboard region is selected, in step S307, the information management module 210 makes the plurality of first keys corresponding to the first keyboard region of the keyboard display the first system information in real-time according to the selected first display pattern, the first keyboard region, and the first system information.

FIG. 4 is a flowchart of step S307 of FIG. 3 according to an embodiment of the disclosure. Referring to FIG. 4, in step S3071, a system monitoring module 220 continuously detects a first status of a first device in a plurality of devices according to the first system information. Specifically, in response to selection of the first system information, an information management module 210 instructs the system monitoring module 220 to continuously detect a status (also called a first status) of a device (also called a first device) corresponding to the first system information. In other words, the system monitoring module 220 does not need to detect statuses of devices corresponding to all system information, but the system monitoring module 220 needs to detect a status of a device only according to the selected first system information.

Next, in step S3073, the information management module 210 determines a first pattern of a plurality of patterns of a first design of the first display pattern, a first color to display the first pattern and a first time length to display the first pattern according to the detected first status.

Specifically, the system monitoring module 220 transmits the detected first status of the first device to the information management module 210 in real-time. Next, the information management module 210 determines the first pattern of the plurality of patterns of the first design according to the first status and the first design of the selected first display pattern. In other words, (as the example described in the foregoing FIG. 5A), the information management module 210 determines the first pattern corresponding to the first state of the first design according to the currently detected first status. In addition, the information management module 210 also determines the first color for displaying the first pattern and the first time length for displaying the first pattern. The first color indicates by using a plurality of keys of the keyboard to emit light of a first color to present the first pattern. The first time length indicates a duration for displaying the first pattern of the first design by using a plurality of keys of the keyboard. It should be noted that first colors of various parts of the first pattern of the first design may be one or more colors, and first time lengths of the various parts of the first pattern of the first design may be different.

In another embodiment, because the first time length indicates time/duration when first keys are controlled to continuously emit light via the light-emitting elements thereof, the information management module 210 may also determine different first time lengths in a time sequence, to let light emitted by the first keys to have an effect of animation.

After the first pattern, the first color, and the first time length are determined, in step S3075, the information management module 210 controls the plurality of first keys to display the first system information according to the first pattern, the first color, and the first time length. Specifically, as mentioned above, a keyboard 102 has a plurality of light-emitting elements corresponding to a plurality of keys. In addition, the information management module 210 may deliver an instruction (for example, by an application interface provided by an operating system installed in the host 100) to the keyboard 102 according to the determined first pattern, first color, and first time length, to control light-emitting elements of the plurality of first keys of the keyboard 102. More specifically, the information management module 210 may select the plurality of first keys to emit light according to a shape of the first pattern. Next, the information management module 210 adjusts the light-emitting elements of the plurality of first keys to emit light of the first color according to the first color. Next, the information management module 210 may also control light-emitting time of the light-emitting elements of the plurality of first keys according to the first time length, so that the plurality of first keys emit light with the first color within the first time length. In this way, a design formed by arrangement of the plurality of first keys that emit light of the first color is the first pattern of the first design.

Figure 5C:
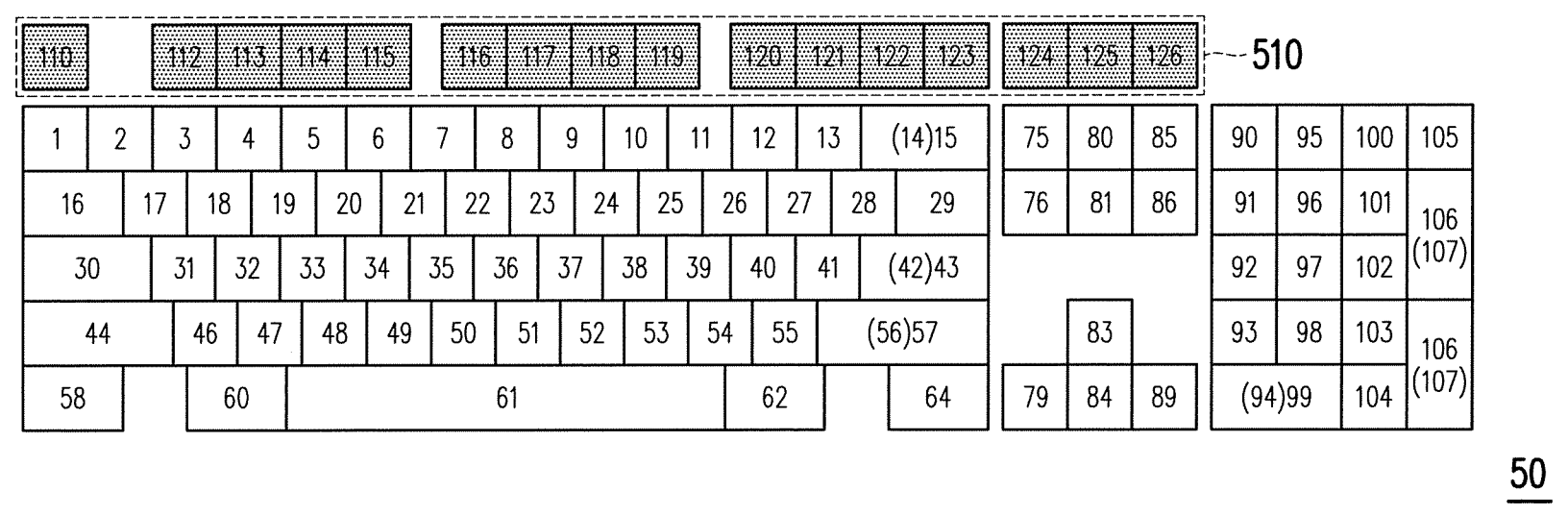

FIGS. 5B and 5C are schematic diagrams of a keyboard that displays system information as a processor temperature according to an embodiment of the disclosure. Referring to FIGS. 5B and 5C at the same time, for example, suppose a first display pattern, in which corresponding system information is a processor temperature, is a first design 501, and a keyboard 50 has set a region for applying the first display pattern as a keyboard region 510 formed by arrangement of a plurality of first keys (that is, keys 110, and 112 to 126). In this example (light-emitting keys are indicated by grey or dark grey dotted shadows in the figures), a color of the plurality of first keys in the keyboard region 510 shown in FIG. 5B is lighter than a color of the plurality of first keys in the keyboard region 510 shown in FIG. 5C. This example indicates that, a processor temperature detected by the system monitoring module 220 at a time point of FIG. 5B is lower than a processor temperature at a time point of FIG. 5C.

Figure 6C:
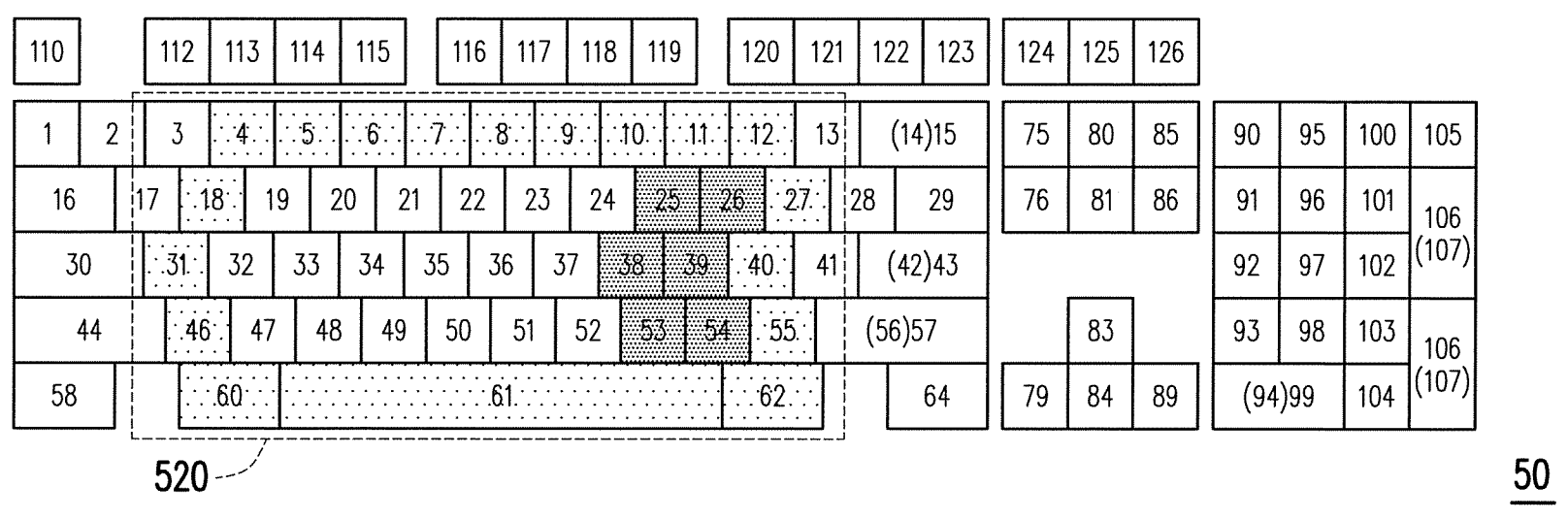

FIG. 6A is a schematic diagram of a display pattern, in which corresponding system information is a battery power level according to an embodiment of the disclosure. FIGS. 6B and 6C are schematic diagrams of a keyboard that displays system information as a battery power level according to an embodiment of the disclosure. First referring to FIG. 6A, for example, suppose a first display pattern, in which corresponding system information is a battery power level, is a first design 502. To indicate the battery power level simply, the first design 502 may have five patterns, and the patterns have dark blocks with different quantities (0, 1, 2, 3, 4), and a current battery power level (0%, 25%, 50%, 75%, 100%) is indicated by using different quantities of dark blocks (i.e., corresponding to 0, 1, 2, 3, 4). For example, the first design 502 drawn in FIG. 6A indicates a pattern that the battery power level is 100% (four dark blocks are drawn in the middle of the first design 502).

In addition, referring to FIGS. 6B and FIG. 6C at the same time, following the foregoing example, suppose the first display pattern, in which the corresponding system information is the battery power level, is the first design 502, and a keyboard 50 has set a keyboard region for applying the first display pattern is a keyboard region 520 formed by arrangement of a plurality of first keys (that is, keys 4 to 13, 18 to 27, 31 to 40, 46 to 55, and 60 to 62). In addition, keys 19, 20, 32, 33, 47, and 48 indicate a first block (from left to right) in the four dark blocks of the first design 502; keys 21, 22, 34, 35, 49, and 50 indicate a second block (from left to right) in the four dark blocks of the first design 502; keys 23, 24, 36, 37, 51, and 52 indicate a third block (from left to right) in the four dark blocks of the first design 502; and keys 25, 26, 38, 39, 53, and 54 indicate a fourth block (from left to right) in the four dark blocks of the first design 502.

In other words, if the first design 502 is a pattern having no block, it indicates that the current battery power level is 0%; if the first design 502 is a pattern having only the fourth block, it indicates that the current battery power level is 25%; if the first design 502 is a pattern having the third and fourth blocks, it indicates that the current battery power level is 50%; and if the first design 502 is a pattern having the second, third and fourth blocks, it indicates that the current battery power level is 75%.

In this example, all of the plurality of first keys corresponding to all the four blocks in the keyboard region 520 drawn in FIG. 6B emit light (light-emitting keys are indicated by grey or dark grey dotted shadows in the figure), and only the first keys corresponding to the fourth block (that is, keys 25, 26, 38, 39, 53, and 54) in the keyboard region 520 drawn in FIG. 6C emit light. This example indicates that at a time point of FIG. 6B, the battery power level detected by the system monitoring module 220 is 100%, and the information management module 210 controls light-emitting elements of the plurality of first keys in the keyboard region 520 according to the detected battery power level, so that all the keys corresponding to the four blocks emit light. Correspondingly, at a time point of FIG. 6C, the battery power level detected by the system monitoring module 220 is 25%, and the information management module 210 controls light-emitting elements of the plurality of first keys in the keyboard region 520 according to the detected battery power level, so that the keys corresponding to the fourth block (that is, keys 25, 26, 38, 39, 53, and 54) emit light, and keys corresponding to the first, second, and third blocks do not emit light.

Figure 7:
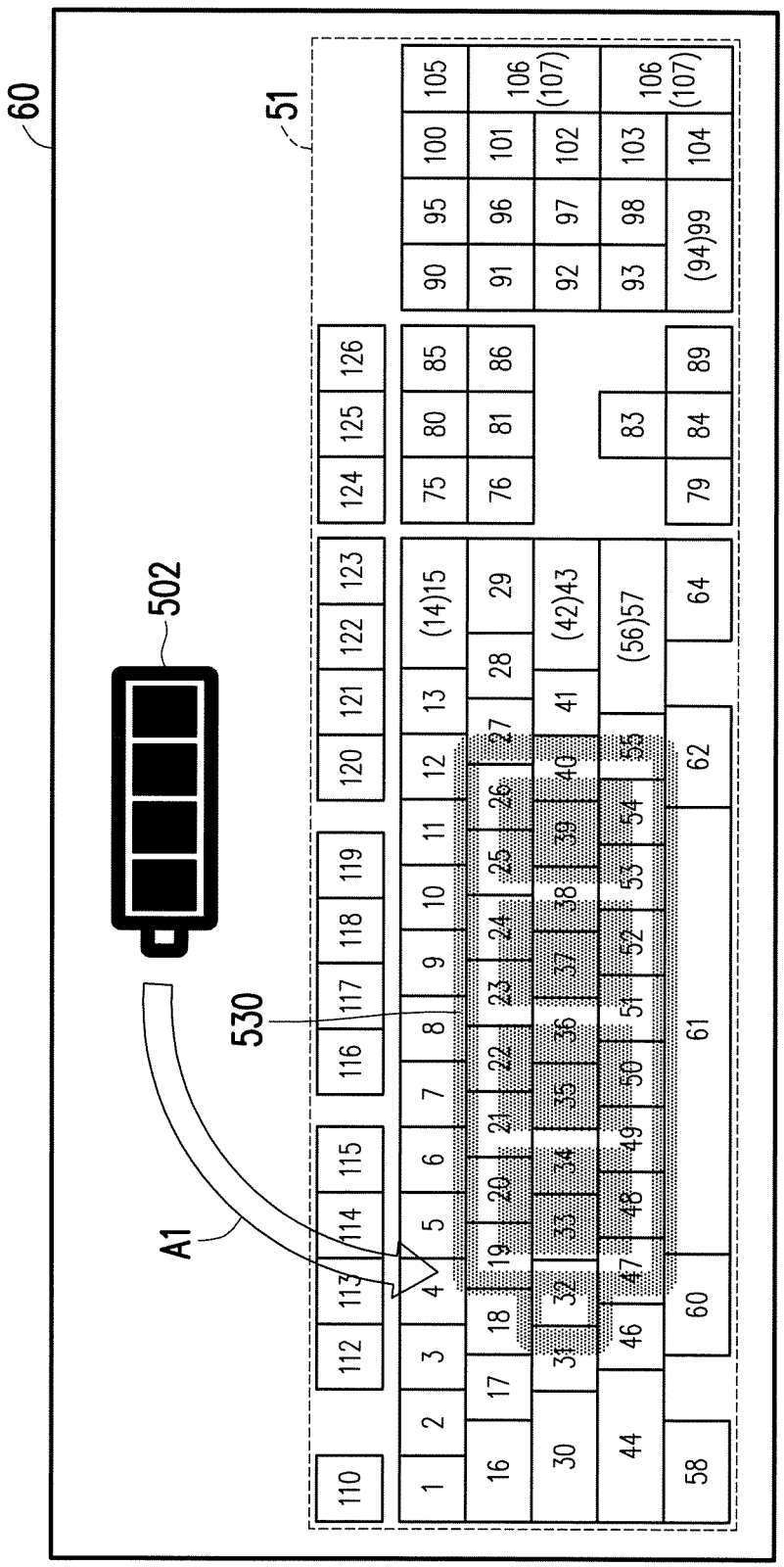
FIG. 7 is a schematic diagram of setting a keyboard region for displaying system information according to an embodiment of the disclosure.

FIG. 7 is a schematic diagram of setting a keyboard region for displaying system information according to an embodiment of the disclosure. Referring to FIG. 7, as stated above, in step 305, the information management module 210 selects a first keyboard region for applying the first display pattern. Specifically, the input module 230 provides an interface to set, by a user, a keyboard region for displaying system information. In the present embodiment, the interface (for example, an image 60) displays a first design of a first display pattern, in which selected system information is a battery power level and a keyboard image 51 corresponding to a keyboard 102. Next, a user may drag the first design 502 into any region on the keyboard image 51 by an indicator control device 103. After receiving this inputting/dragging operation, the input module 230 generates a third input signal to an information management module, so that the information management module 210 drags, according to the third input signal in a dragging manner (for example, shown by arrow A1), the first design 502 into the keyboard image 51 that has a plurality of keys and corresponds to the keyboard 102. However, in another embodiment, the input module 230 directly drags, according to the third input signal in a dragging manner, the first design 502 into the keyboard image 51 that has a plurality of keys and corresponds to the keyboard 102.

Next, the information management module 210 identifies a plurality of first keys overlapping with the dragged first design in the plurality of keys of the keyboard image 51, and sets a region formed by arrangement of the plurality of first keys as the first keyboard region.

For example, referring to FIG. 7 and FIG. 6B at the same time, the information management module 210 identifies the plurality of first keys overlapping with the dragged first design 530 as keys 4 to 13, 18 to 27, 31 to 40, 46 to 55, and 60 to 62, and the information management module 210 sets the region formed by arrangement of the keys 4 to 13, 18 to 27, 31 to 40, 46 to 55, and 60 to 62 as the keyboard region 520 shown in FIG. 6B.

It is worth mentioning that in the present embodiment, the information management module 210, the system monitoring module 220, and the input module 230 are implemented in a manner of software, but the present disclosure is not limited thereto. The information display method and the information display system of the disclosure may also implement functions the same as those of software in a maimer of a hardware circuit. For example, the information management module 210 may be actually used as an information management circuit unit coupled to the processor 110, and is configured to execute a function of the information management module 210; the system monitoring module 220 may be actually used as a system monitoring circuit unit coupled to the processor 110, and is configured to execute a function of the system monitoring module 220. By such analogy, the input module 230 may be actually used as an input circuit unit coupled to the processor 110. In addition, the foregoing information management circuit unit, system monitoring circuit unit, and input circuit unit may also be integrated into the keyboard 102, so that the keyboard 102 can be externally connected to any electronic device, thereby displaying system information of the electronic device.

It should be noted that the foregoing method according to the disclosure may be implemented in hardware or firmware, or may be implemented as software or a computer code that can be stored in a recording medium (for example, a CD ROM, a RAM, a floppy disk, a hard disk or a magneto-optical disc), or may be implemented as software or a computer code downloaded from a network and stored in a non-transitory machine readable medium; therefore, the method described herein can be implemented in such software that uses a general-purpose computer, a special-purpose processor or programmable or special-purpose hardware (for example, an ASIC or an FPGA). A person of ordinary skill in the art should understand that a computer, a processor, a micro-processor controller, or programmable hardware comprises a storage component (for example, a RAM, a ROM, or a flash memory) that can store or receive software or a computer code. When the software or computer code is accessed and executed by the computer, the processor or the hardware implements the processing method described herein. In addition, it should be noted that, when a general-purpose computer accesses a code configured to implement the processing described herein, execution of the code converts the general-purpose computer into a special-purpose computer configured to execute the processing described herein.

Based on the above, according to the information display method and the information display system provided by an embodiment of the disclosure, a user can select system information to be concerned about and a keyboard region to be configured, so as to control a plurality of keys in the keyboard region on the keyboard according to different display patterns and the system information detected in real-time, thereby making a design formed by arrangement of the keys display the detected system information.

Although the disclosure is disclosed above by using the embodiments, the embodiments are not intended to limit the disclosure. Any person of ordinary skill in the art can make some variations and modifications to the present invention without departing from the spirit and scope of the present invention. Therefore, the protection scope of the disclosure is subject to the appended claims.

It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:

1. An information display method, applied to a computer having a keyboard, the method comprising:
    selecting a first system information among a plurality system information, wherein the system information is used to respectively indicate statuses of a plurality of devices of the computer, and the first system information indicates a current status among a plurality of statuses of a first device of the computer;
    selecting a first display pattern among a plurality of display patterns according to the first system information
    wherein the first display pattern records a plurality of display settings, the display settings comprising:
        a first design used to display the first system information, wherein the first design comprises a plurality of different patterns respectively presenting the plurality of statuses of the first device corresponding to the first system information;
        a plurality of colors used to display the patterns of the first design; and
        a plurality of time lengths used to display the patterns of the first design;
    selecting a first keyboard region of the keyboard for applying the first display pattern;
    detecting the current status of the first device according to the selected first system information;
    determining, according to the detected current status, a first pattern corresponding to the detected current status among the different patterns, a first color among the colors of the first design to display the first pattern, and a first time length among the time lengths of the first design;
    selecting a plurality of first keys in the first keyboard region according to the first pattern, wherein a shape of a region disposed by the selected the first keys on the keyboard corresponds to a shape of the first pattern; and controlling the selected first keys to emit light having the first color for the first time length, so as to show in real-time a visual content having the shape of the first pattern and reflecting the detected current status of the first device.

2. The information display method according to claim 1, wherein the foregoing step of selecting the first keyboard region for applying the first display pattern comprises:
dragging the first design into a keyboard image that has a plurality of keys and corresponds to the keyboard in a dragging manner;
identifying a plurality of second keys overlapping with the dragged first design in the plurality of keys of the keyboard image; and
setting a region formed by arrangement of the second keys as the first keyboard region, wherein the first keys is selected from the second keys.

3. The information display method according to claim 1, wherein the foregoing step of controlling the selected first keys to emit the light having the first color for the first time length, so as to show in real-time the visual content having the shape of the first pattern and reflecting the detected current status of the first device comprises:
controlling a backlight module of each of the first keys according to the first pattern, the first color, and the first time length, so that the first keys emit light of the first color in the first time length.

4. An information display system, comprising:
a keyboard; and
a host, coupled to the keyboard, the host comprising:
a processor; and
a storage device, coupled to the processor, configured to record a display pattern database and a system information database,
wherein the processor comprises:
an information management-circuit;
a system monitoring circuit; and
an input-circuit, configured to receive a plurality of input signals
wherein the information management circuit selects, according to a first input signal in the input signals, a first system information among a plurality of system information recorded by the system information database, wherein the first system information indicates a current status among a plurality of statuses of a first device of a computer,
wherein the information management circuit selects, according to the first system information and a second input signal in the input signals, a first display pattern among a plurality of display patterns recorded by the display pattern database,
wherein the information management circuit selects, according to a third input signal in the input signals, a first keyboard region of the keyboard used to apply the first display pattern,
wherein the first display pattern records a plurality of display settings, the display settings comprising:
a first design used to display the first system information, wherein the first design comprises a plurality of different patterns respectively presenting the plurality of statuses of the first device corresponding to the first system information;
a plurality of colors used to display the patterns of the first design; and
a plurality of time lengths used to display the patterns of the first design,
wherein, according to the selected first system information, the system monitoring circuit continuously detects the current status of the first device,
wherein, according to the detected current status, the information management circuit determines a first pattern corresponding to the detected current status among the different patterns, a first color among the colors of the first design to display the first pattern, and a first time length among the time lengths of the first design,
wherein the information management module circuit selects a plurality of first keys in the first keyboard region according to the first pattern, wherein a shape of a region disposed by the selected the first keys on the keyboard corresponds to a shape of the first pattern,
wherein the information management module circuit controls the selected first keys to emit light having the first color for the first time length, so as to show in real-time a visual content having the shape of the first pattern and reflecting the detected current status of the first device.

5. The information display system according to claim 4, wherein in the foregoing operation that the information management circuit selects, according to the third input signal in the input signals, the first keyboard region of the keyboard used to apply the first display pattern,
the information management circuit drags the first design into a keyboard image that has a plurality of keys and corresponds to the keyboard in a dragging manner,
wherein the information management circuit identifies a plurality of second keys overlapping with the dragged first design in the plurality of keys of the keyboard image,
wherein the information management circuit sets a region formed by arrangement of the second keys as the first keyboard region, wherein the first keys is selected from the second keys.

6. The information display system according to claim 4, wherein in the foregoing operation that the information management module circuit controls the selected first keys to emit the light having the first color for the first time length, so as to show in real-time the visual content having the shape of the first pattern and reflecting the detected current status of the first device, the information management circuit controls a backlight module of each of the first keys according to the first pattern, the first color, and the first time length.

* * * * *